(12) United States Patent
Choi

(10) Patent No.: US 8,814,223 B2
(45) Date of Patent: Aug. 26, 2014

(54) FLEXIBLE PIPE CONNECTED WITH FLEXIBLE PIPE CONNECTING STRUCTURE AND METHOD OF CONNECTING FLEXIBLE PIPE CONNECTING STRUCTURE WITH FLEXIBLE PIPE

(75) Inventor: Jin Lim Choi, Sungnam-si (KR)

(73) Assignee: Dong-A Flexible Metal Tubes Co., Ltd., Seoul (KR)

( * ) Notice: Subject to any disclaimer, the term of this patent is extended or adjusted under 35 U.S.C. 154(b) by 0 days.

(21) Appl. No.: 13/576,684

(22) PCT Filed: Jan. 28, 2011

(86) PCT No.: PCT/KR2011/000617
§ 371 (c)(1),
(2), (4) Date: Aug. 2, 2012

(87) PCT Pub. No.: WO2011/096678
PCT Pub. Date: Aug. 11, 2011

(65) Prior Publication Data
US 2012/0312410 A1   Dec. 13, 2012

(30) Foreign Application Priority Data

Feb. 3, 2010   (KR) .......................... 10-2010-0010051

(51) Int. Cl.
*F16L 13/02*   (2006.01)
(52) U.S. Cl.
USPC .......................... 285/288.1; 285/903; 29/456
(58) Field of Classification Search
CPC .......................... F16L 25/0045; F16L 25/0036
USPC ............. 285/903, 288.1, 288.5, 288.6, 289.2, 285/289.3, 288.11, 289.5; 29/525.14
See application file for complete search history.

(56) References Cited

U.S. PATENT DOCUMENTS 2,142,357 A * 1/1939 Jacobson ................... 285/289.1
2,300,517 A * 11/1942 Milton ............................ 29/828
(Continued)

FOREIGN PATENT DOCUMENTS

JP         56-154219      11/1981
JP         2004-052825     2/2004
KR       10-2008-0079473   9/2008

OTHER PUBLICATIONS

International Search Report issued in PCT Application No. PCT/KR2011/000617 dated Oct. 14, 2011.

*Primary Examiner* — David E Bochna
(74) *Attorney, Agent, or Firm* — KED & Associates LLP

(57) ABSTRACT

The flexible pipe connected with the flexible pipe connecting structure according to an embodiment of the present invention, wherein the connecting structure includes a body part, and a connecting part configured to have a smaller thickness than a thickness of the body part, wherein the first end portion is inserted into and welded to the connecting part, wherein the ledge is a step part provided between the body part and the connecting part. Also, a method of connecting a flexible pipe connecting structure with a flexible pipe according to an embodiment of the present invention, comprises a filler metal applying step of applying a filler metal on at least one of a first end portion of the flexible pipe having ridges and valleys and a connecting part of the flexible pipe connecting structure into which the first end portion is inserted, a flexible pipe inserting step of inserting the first end portion of the flexible pipe into the connecting part of the flexible pipe connecting structure so that the first end portion is held by a ledge formed on the flexible pipe connecting structure, and a flexible pipe welding step of heating at least a part of the flexible pipe inserted into the flexible pipe connecting structure so that the first end portion of the flexible pipe is welded to the flexible pipe connecting structure by the filler metal.

6 Claims, 3 Drawing Sheets

(56) References Cited

U.S. PATENT DOCUMENTS

| | | | |
|---|---|---|---|
| 2,473,879 A * | 6/1949 | Guarnaschelli | 285/289.1 |
| 2,678,836 A * | 5/1954 | Courtot | 285/289.1 |
| 3,023,496 A * | 3/1962 | Humphrey | 285/288.1 |
| 3,307,589 A * | 3/1967 | Sheffield | 285/222.5 |
| 4,089,351 A * | 5/1978 | Ward et al. | 285/84 |
| 4,369,911 A * | 1/1983 | Blumenberg | 285/288.1 |
| 4,527,819 A * | 7/1985 | Desilets et al. | 285/288.9 |
| 5,172,477 A * | 12/1992 | Hadley | 29/446 |
| 5,297,586 A * | 3/1994 | McIntosh | 138/109 |
| 5,404,632 A * | 4/1995 | Zaborszki | 29/508 |
| 5,813,438 A * | 9/1998 | Reed | 285/903 |
| 7,399,942 B2 | 7/2008 | Wang et al. | |

* cited by examiner

FLEXIBLE PIPE CONNECTED WITH FLEXIBLE PIPE CONNECTING STRUCTURE AND METHOD OF CONNECTING FLEXIBLE PIPE CONNECTING STRUCTURE WITH FLEXIBLE PIPE

TECHNICAL FIELD

The present invention relates to a flexible pipe connected with a flexible pipe connecting structure and a method of connecting a flexible pipe connecting structure with a flexible pipe, and more specifically to a flexible pipe connected with a flexible pipe connecting structure and a method of connecting a flexible pipe connecting structure with a flexible pipe, which facilitates welding of the flexible pipe and are less affected by heat from a heat treatment.

BACKGROUND ART

In general, flexible pipes used for piping in airplanes, vehicles, mechanical facilities, and buildings are formed of stainless steel and connecting structures, such as flanges or elbows, are connected at both ends thereof by an arc welding method, a plasma welding method, a brazing welding method, or by using screw connecting structures.

A stainless flexible pipe has a thickness of 0.3 mm or less and a nipple or fitting of a connecting structure welded thereto generally has a thickness of 1 mm or more. Due to a difference in thickness, thin plate welding was impossible.

Accordingly, a ring for welding with a thickness of 0.5 mm or more was first welded to the flexible pipe by arc welding or plasma welding, and then the ring for welding was welded to the nipple or fitting of the connecting structure. This required a complicated welding process and high welding costs. Moreover, cracks or corrosion occurred at thin welded bead zones and heat affected zones of the flexible pipe due to a welding stress.

Meanwhile, a brazing welding method could not be performed by a less skilled welding operator but only by a person skilled in the welding art in the case of welding a short-length flexible pipe to a connecting structure having a nipple or fitting with a thickness of 1 mm or more. Further, there was a problem in that cracks and corrosion took place at welded zones and heat affected zones due to a welding stress.

DISCLOSURE OF INVENTION

Technical Problem

An object of the present invention is to provide a flexible pipe connected with a flexible pipe connecting structure that facilitates welding of the flexible pipe and is less affected by heat due to a heat treatment and a method of connecting a flexible pipe with a flexible connecting structure.

Objects of the present invention are not limited to the foregoing object and other objects are apparent to one of ordinary skill in the art from the below description.

Solution to Problem

To achieve the above objects, there is provided a flexible pipe connected with the flexible pipe connecting structure according to an embodiment of the present invention, wherein the connecting structure includes a body part, and a connecting part configured to have a smaller thickness than a thickness of the body part, wherein the first end portion is inserted into and welded to the connecting part, wherein the ledge is a step part provided between the body part and the connecting part.

Also, to achieve the above objects, there is provided a method of connecting a flexible pipe connecting structure with a flexible pipe according to an embodiment of the present invention, comprises a filler metal applying step of applying a filler metal on at least one of a first end portion of the flexible pipe having ridges and valleys and a connecting part of the flexible pipe connecting structure into which the first end portion is inserted, a flexible pipe inserting step of inserting the first end portion of the flexible pipe into the connecting part of the flexible pipe connecting structure so that the first end portion is held by a ledge formed on the flexible pipe connecting structure, and a flexible pipe welding step of heating at least a part of the flexible pipe inserted into the flexible pipe connecting structure so that the first end portion of the flexible pipe is welded to the flexible pipe connecting structure by the filler metal.

Detailed description on the embodiments will be given with reference to the accompanying drawings.

Advantageous Effects of Invention

A flexible pipe connected with a flexible pipe connecting structure and a method of connecting a flexible pipe connecting structure with a flexible pipe according to the present invention provide the following effects:

First, since the filler metal is melted on at least one of ridges and valleys of the flexible pipe and the connecting part of the flexible pipe connecting structure so that the connecting part is welded to the flexible pipe, welding may be performed even by an unskilled person.

Secondly, since the ledge is provided, when the flexible pipe is connected with the flexible pipe connecting structure, the flexible pipe is supported.

Thirdly, since the ledge is provided, the melted filler metal is prevented from flowing down. Thus, the filler metal is applied at a gap between the flexible pipe connecting structure and the end portion of the flexible pipe to facilitate welding.

Fourthly, since welding is done between the end section of the flexible pipe and the step part, the flexible pipe may be welded to the connecting part of the flexible pipe connecting structure without the filler metal applied on the ridges and valleys of the flexible pipe flowing to the outside.

Fifthly, since the spiral ridges and valleys are formed on the end portion of the flexible pipe and the connecting part, the flexible pipe is rotatingly connected with the connecting part by the ridges and valleys in a screwing manner, and by the connection, the connected situation is maintained by a predetermined strength before welding.

Sixthly, since in the flexible pipe welding step, heat treatment of the flexible pipe and welding by the filler metal are simultaneously performed in the same heat treatment furnace upon heat treatment of the flexible pipe, no separate welding process is required, thus saving manufacturing costs.

Seventhly, since a thermal stress that may occur due to welding heat caused when a separate welding process is performed does not take place, corrosion at a welded zone due to the thermal stress is prevented.

Eighthly, since in the flexible welding step, heat is evenly spread over the entire flexible pipe and flexible pipe connecting part when the filler metal is melted and welded, melting and welding of the filler metal are easily done, thus enhancing a welding strength.

Finally, since in the flexible welding step, the flexible pipe and the flexible pipe connecting part are integrally welded in the heat treatment furnace, welding may be performed irrespective of the length of the flexible pipe and since the flexible pipe connecting structure is provided, no separate welding ring is required, allowing even an unskilled person to perform welding.

The effects of the present invention are not limited to the foregoing effects, and other effects may be clearly understood by those skilled in the art from the accompanying claims.

BEST MODE FOR CARRYING OUT THE INVENTION

Figure 1:
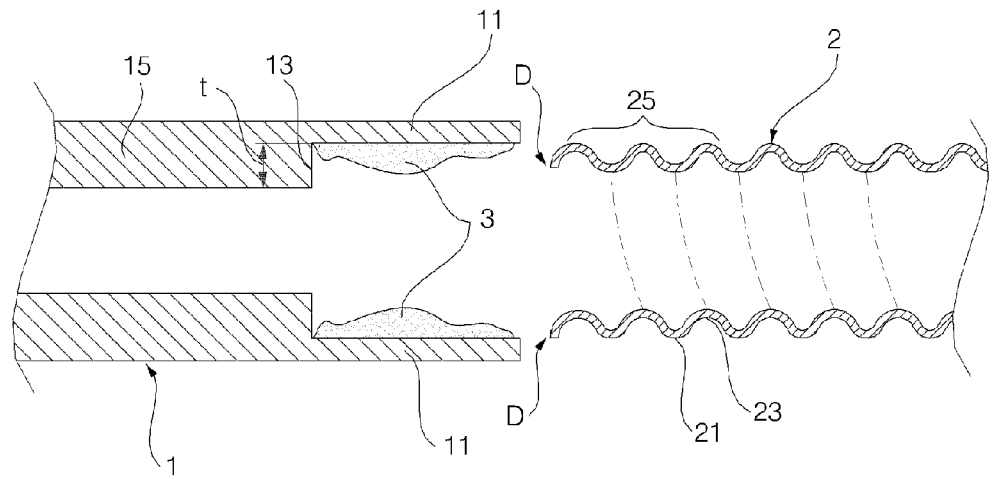
FIG. 1 is a cross sectional view illustrating a flexible pipe and a flexible pipe connecting structure according to an embodiment of the present invention.

Other advantages, features, and methods for achieving the same will be apparent from the accompanying drawings and embodiments described in detail in conjunction with the drawings. However, the present invention is not limited to the embodiments and various modifications or variations are possible without departing from the accompanying claims. It should be noted that the embodiments are provided only to fully disclose the present invention and to provide the category of the present invention to those skilled in the art. The present invention is defined only by the accompanying claims. The same reference numerals are used to denote the same or substantially the same elements throughout the drawings and the specification.

Hereinafter, the present invention will be described with reference to the accompanying drawings.

Figure 2:
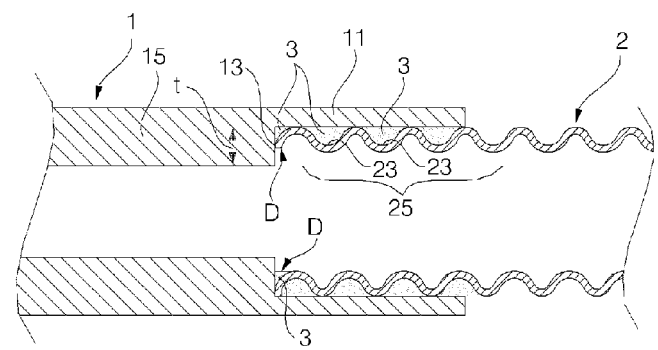
FIG. 2 is a view illustrating a situation where the flexible pipe connecting structure 1 is connected to the flexible pipe 2.
Figure 3:
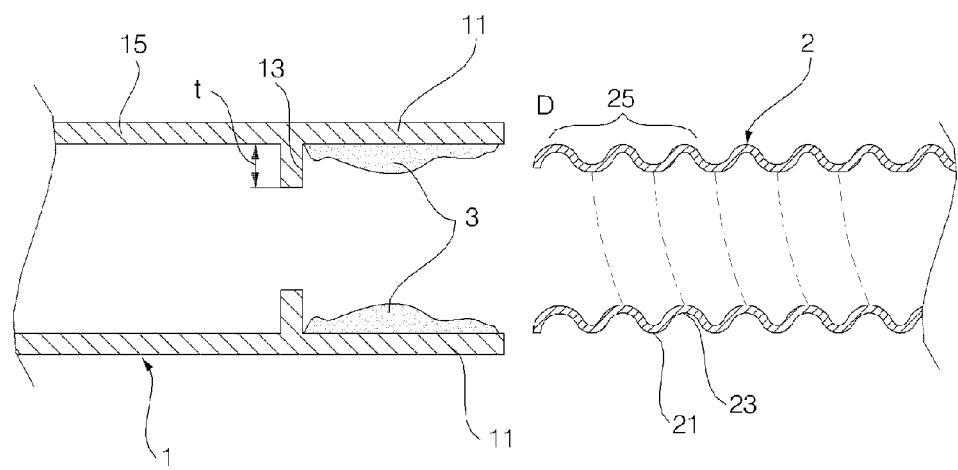
FIG. 3 is a view illustrating a ledge according to another embodiment of the present invention.

FIG. 1 is a cross sectional view illustrating a flexible pipe 2 and a flexible pipe connecting structure 1 according to an embodiment of the present invention, FIG. 2 is a view illustrating a situation where the flexible pipe connecting structure 1 is connected to the flexible pipe 2, and FIG. 3 is a view illustrating a ledge 13 according to another embodiment of the present invention.

Referring to FIGS. 1 to 3, the flexible pipe 2 connected to the flexible pipe connecting structure 1 according to an embodiment of the present invention includes the flexible pipe connecting structure 1 having a ledge 13 on an outer surface or an inner surface and the flexible pipe 2 whose one end portion 25 has ridges 21 and valleys 23, wherein the one end portion 23 is inserted into at least part of the flexible pipe connecting structure 1 and stopped by the ledge 13 and welded to the flexible pipe connecting structure 1 by a filter metal 3.

The flexible pipe 2 is formed of corrosion-resistant steel that contains chrome and nickel, or elements, such as nickel, tungsten, titanium, or molybdenum according to the use. The flexible pipe 2 is installed in an airplane, a vehicle, a mechanical facility, or a building to form a fluid path through which a fluid passes.

The flexible pipe 2 is formed of a flexible tube that includes a plurality of ridges 21 and valleys 23 to allow for bending or extension. The end portion 25 of the flexible pipe 2 is a part of the flexible pipe 2 which is connected with the flexible pipe connecting structure 1 as described later, and also includes the ridges 21 and the valleys 23 like the flexible pipe 2.

The flexible pipe 2 is preferably formed of austenite-based stainless steel, such as STS 304 and STS 316L, wherein STS 304 contains C of 0.08% or less, Si of 0.5 to 0.75%, P of 0.035% or less, Ni of 8.00 to 15.00%, and Cr of 17.00 to 18.00%. STS 316L means stainless steel that contains C of 0.03% or less, Si of 0.5 to 0.75%, P of 0.035% or less, S of 0.03% or less, Ni of 12.00 to 15.00%, Cr of 17.00 to 18.00%, and Mo of 2.00 to 3.00%.

The flexible pipe connecting structure 1 is a sort of connecting member for insertion of the flexible pipe 2. The flexible pipe connecting structure 1 is used for extending the flexible pipe 2 by connecting the flexible pipe 2 with another flexible pipe 2, or for connection with other devices or for connection to another flexible pipe 2 having a different diameter. Structures in which the flexible pipe 2 is inserted into the flexible pipe connecting structure 1 may be various, and will be described later.

Preferably, the flexible pipe connecting structure 1 is formed of a carbon steel forging (KSD3710) or carbon steel casting (KSD4101), but the material of the flexible pipe connecting structure 1 is not limited thereto.

The ledge 13 is formed on at least one of an inner surface or an outer surface. The ledge 13 functions as a stopper that stops the end portion 25 of the flexible pipe 2 after the end portion 25 is inserted into the flexible pipe connecting structure 1 by a predetermined distance and prevents the filler metal 3 from flowing down during welding. The functions of the ledge 13 during welding will be described later.

When the end portion 25 of the flexible pipe 2 is inserted into the flexible pipe connecting structure 1, the end portion 25 is stopped by the ledge 13 so that the end portion 25 of the flexible pipe 2 is inserted into at least a part of the flexible pipe connecting structure 1.

The ledge 13 may be formed one at least one of an inner surface or an outer surface of the flexible pipe connecting structure 1. Referring to FIGS. 1 to 3, the ledge 13 is formed on an inner surface of the flexible pipe connecting structure 1. In a case where the end portion 25 of the flexible pipe 2 is inserted into the flexible pipe connecting structure 1 along an inner surface of the flexible pipe connecting structure 1, the ledge 13 is formed on the inner surface of the flexible pipe connecting structure 1 to serve as a stopper and to prevent the filler metal 3 from flowing down during welding. An example where the ledge 13 is formed on an outer surface of the flexible pipe connecting structure 1 will be described in detail with reference to FIGS. 5 and 7.

The filler metal 3 preferably includes a paste-type BNi-based material. Specifically, the filler metal 3 varies with the material of the flexible pipe 2. In the case of the flexible pipe 2 formed of STS 304 and STS 316L, it is preferable to use a BNi-based filler metal 3 that has a temperature range of 1065° C. to 1120° C. for solution heat treatment to remove stress, and a welding temperature of 1050° C. to 1150° C. which is similar to the solution heat treatment temperature of the flexible pipe 2 and contains Ni of 65 to 75%, Cr of 13 to 20%, B of 2.75 to 4.75%, and a tiny amount of Fe, Si, and C.

The filler metal 3 may be applied on at least a part of the flexible pipe connecting structure 1 or the end portion 25 of the flexible pipe 2. Although it is hereinafter described that the filler metal 3 is applied on at least a part of the flexible pipe connecting structure 1, the present invention is not limited thereto.

The filler metal 3 may be applied on at least one of an outer surface or an inner surface of the flexible pipe connecting structure 1. This varies depending on embodiments where the end portion 25 of the flexible pipe 2 is inserted into the flexible pipe connecting structure 1, and will be described later. Although it is hereinafter described that the end portion 25 of the flexible pipe 2 is inserted into an inner surface of the flexible pipe connecting structure 1, the present invention is not limited thereto.

The end portion 25 of the flexible pipe 2 is inserted into the flexible pipe connecting structure 1 while the filler metal 3 is applied on a part of the flexible pipe connecting structure 1, and the ledge 13 stops the end portion 25 of the flexible pipe 2. Under this circumstance, when reaching a welding temperature by a welding device or heat treatment furnace, the filler metal 3 is melted so that the end portion 25 of the flexible pipe 2 is welded to the flexible pipe connecting structure 1.

At this time, the ledge 13 seals a gap between the flexible pipe connecting structure 1 and the end portion 25 of the flexible pipe 2 so that the melted filler metal 3 does not flow down. Specifically, the filler metal 3 applied on the flexible pipe connecting structure 1 is provided between the flexible pipe connecting structure 1 and the end portion 25 of the flexible pipe 2 and, if reaching a melting temperature, welding is performed while the filler metal 3 is in the liquid state with viscosity. At this time, without the ledge 13, the filler metal 3 flows down along an inner surface of the flexible pipe connecting structure 1 so that welding between the flexible pipe connecting structure 1 and the end portion 25 of the flexible pipe 2 is incompletely done. Accordingly, the ledge 13 formed in the flexible pipe connecting structure 1 stops the filler metal 3 from flowing down when melted so that the filler metal 3 is melted down in a gap between the flexible pipe connecting structure 1 and the end portion 25 of the flexible pipe 2 to facilitate welding. Further, since the ledge 13 is welded to the end portion of the flexible pipe 2, the filler metal 3 applied on the ridges 21 and the valleys 23 of the flexible pipe 2 is welded to a connecting part 11 of the flexible pipe connecting structure 1 without flowing to the outside.

The flexible pipe 2 is welded to the flexible pipe connecting structure 1 at a temperature of 1050° C. to 1150° C. This temperature corresponds to the solution heat treatment temperature to remove a welding stress and work hardening. The filler metal 3 has a material that is melted and begins welding at a temperature of 1050° C. to 1150° C. As described above, a BNi-based filler metal 3 is used. Accordingly, during heat treatment of the flexible pipe 2, heat treatment of the flexible pipe 2 and welding by the filler metal 3 (brazing welding, brazing) are simultaneously performed in the same heat treatment furnace and thus a separate welding process is not conducted, thus saving manufacturing costs. Further, since a thermal stress due to welding heat that may be caused when a separate welding process is performed does not occur, a welded zone is prevented from taking place due to a thermal stress.

Also, since heat is evenly transferred over the entire 2 and the flexible pipe connecting structure 1 when the filler metal 3 is melted and welded, the filler metal 3 is melted well, so that a weld strength is enhanced.

Also, since the flexible pipe 2 and the flexible pipe connecting structure 1 are integrally welded in the heat treatment furnace, welding may be done irrespective of the length of the flexible pipe 2, and since the flexible pipe connecting structure 1 is provided and thus no separate welding ring is necessary, welding may be performed even by an unskilled person.

Finally, the flexible pipe 2 and the flexible pipe connecting structure 1 completely having experienced the heat treatment and welding are withdrawn from the inside by a heat treatment and then cooled, then completing the welding process.

Hereinafter, a construction of the flexible pipe connecting structure 1 and a specific structure where welding is performed by the filler metal 3 will be described in detail.

A construction of the flexible pipe connecting structure 1 will be first described. The flexible pipe connecting structure 1 includes a body part 15 and a connecting part 11 that is formed to have a smaller thickness than that of the body part 15, wherein the end portion 25 of the flexible pipe 2 is inserted into the connecting part 11.

The body part 15 refers to a portion of the flexible pipe connecting structure 1 that configures a body of the flexible pipe connecting structure 1.

The connecting part 11 refers to a portion into which the end portion 25 of the flexible pipe 2 is inserted and welded. The connecting part 11 is formed to be smaller in thickness than the body part 15. In this case, the ledge 13 corresponds to a step part 13 formed between the body part 15 and the connecting part 11. Due to a difference in thickness between the body part 15 and the connecting part 11 formed to have a smaller thickness than that of the body part 15, the step part 13 is formed, thus functioning as the above-described ledge 13.

Also, as another embodiment of the ledge 13, as shown in FIG. 3, a protruding part 13 may be formed to be protruded from an inner surface or an outer surface of the flexible pipe connecting structure 1. Although it is hereinafter described that the ledge 13 is the step part 13 as shown in FIGS. 1 and 2, the shape or position of the ledge 13 is not limited thereto.

An outer surface or an inner surface of the connecting part 11, respectively, contacts an inner surface or an outer surface of the end portion 25 of the flexible pipe 2. That is, when the end portion 25 of the flexible pipe 2 is inserted along an inner surface of the connecting part 11, an outer surface of the end portion 25 of the flexible pipe 2 is brought in contact with an inner surface of the connecting part 11. At this time, the filler metal 3 is applied on the inner surface of the connecting part 11. In addition, when the end portion 25 of the flexible pipe 2 is inserted along an outer surface of the connecting part 11, an inner surface of the end portion 25 of the flexible pipe 2 is brought in contact with an outer surface of the connecting part 11. At this time, the filler metal 3 is applied on the outer surface of the connecting part 11. It will be hereinafter described that the outer surface of the end portion 25 of the flexible pipe 2 contacts the inner surface of the connecting part 11, and the latter will be described later with reference to FIG. 5.

The step part 13 has a thickness (t) of 0.01 mm to 0.03 mm. The step part 13 is preferably formed to have a small thickness to support the flexible pipe 2 and to form a conforming fluid path between the flexible pipe 2 and the flexible pipe connecting structure 1, and the thickness is preferably in a range from 0.01 mm to 0.03 mm.

Upon welding, at least the step part 13 and an end section D of the flexible pipe 2 are welded to each other by the filler metal 3. As described above, when the flexible pipe connecting structure 1 and the end portion 25 of the flexible pipe 2 are welded to each other, the step part 13 of the flexible pipe connecting structure 1 and the end section D of the end portion 25 of the flexible pipe 2 are welded to each other by the filler metal 3. That is, the step part 13 and the end section D of the flexible pipe 2 are welded to each other to prevent the melted filler metal 3 from flowing down between the end portion 25 of the flexible pipe 2 and the connecting part 11.

The filler metal 3 may be welded to a portion of the end section D of the flexible pipe 2, or may be welded to between the entire circumference of the end section D and the step part 13. As described above, the step part 13 prevents the filler metal 3 from flowing down when melted, and the filler metal 3 is melted and welded between the end section D of the flexible pipe 2 and the step part 13. Also, since the end section D of the flexible pipe 2 is welded to the step part 13, the flexible pipe 2 may be welded to the connecting part 11 of the flexible pipe connecting structure 1 without the filler metal 3 applied on the ridges 21 and the valleys 23 of the flexible pipe 2 flowing to the outside.

Figure 4:
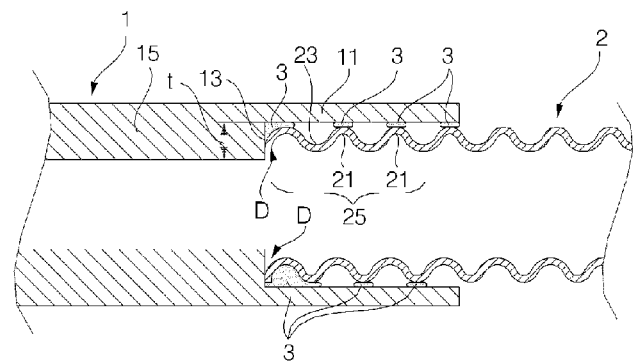
FIG. 4 is a view illustrating situations where the flexible pipe connecting structure 1 and the flexible pipe 2 are welded to each other.

FIGS. 2 and 4 are views illustrating situations where the flexible pipe connecting structure 1 and the flexible pipe 2 are welded to each other.

Referring to FIGS. 2 and 4, at least some of the ridges 21 and the valleys 23 of the flexible pipe 2 are welded to the connecting part 11 by the filler metal 3.

As described above, the filler metal 3 is provided between an inner surface of the flexible pipe connecting structure 1 and an outer surface of the end portion 25 of the flexible pipe 2, and under this situation, melting and welding are performed. When melted, the filler metal 3 is melted between the end section D of the flexible pipe 2 and the step part 13. Further, as shown in FIG. 2, welding may be done with the filler metal 3 filled in at least some of the valleys 23 of the end portion 25 of the flexible pipe 2 that is inserted into the connecting part 11 of the flexible pipe connecting structure 1. That is, if the end portion 25 of the flexible pipe 2 is inserted into the connecting part 11 with the filler metal 3 applied on the connecting part 11, the filler metal 3 is filled in at least some of the valleys 23 that are empty spaces between the connecting part 11 and the end portion 25 of the flexible pipe 2. Under this situation, melting is done so that the connecting part 11 is welded to the end portion 25 of the flexible pipe 2. Further, as shown in FIG. 4, welding may be performed with the filler metal 3 filled in between at least some ridges 21 of the end portion 25 of the flexible pipe 2 and the connecting part 11. And, the connecting part 11 may be welded to the end portion 25 of the flexible pipe 2 with the filler metal 3 filled in some of the ridges 21 and some of the valleys 23.

Figure 5:
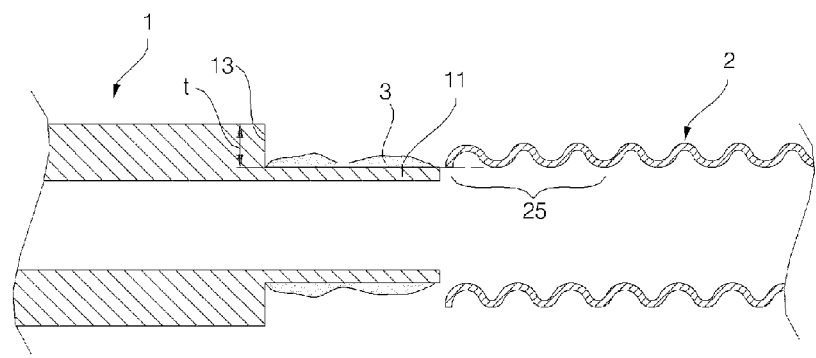
FIGS. 5 to 7 are views illustrating flexible pipe connecting structures 1 according to other embodiments of the present invention.
Figure 6:
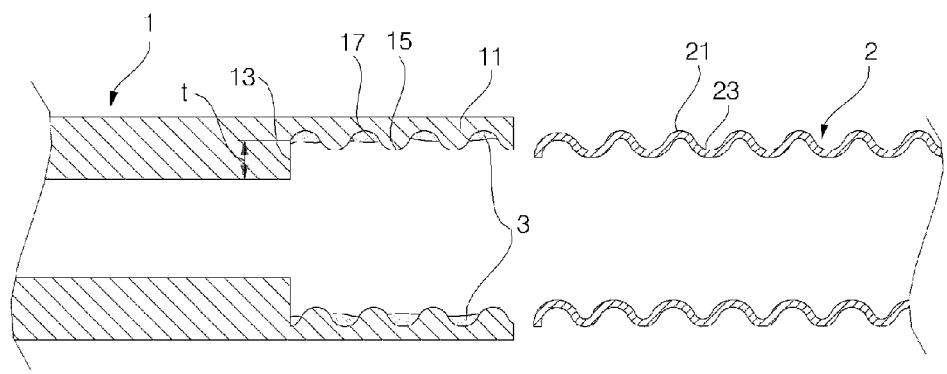
Figure 7:
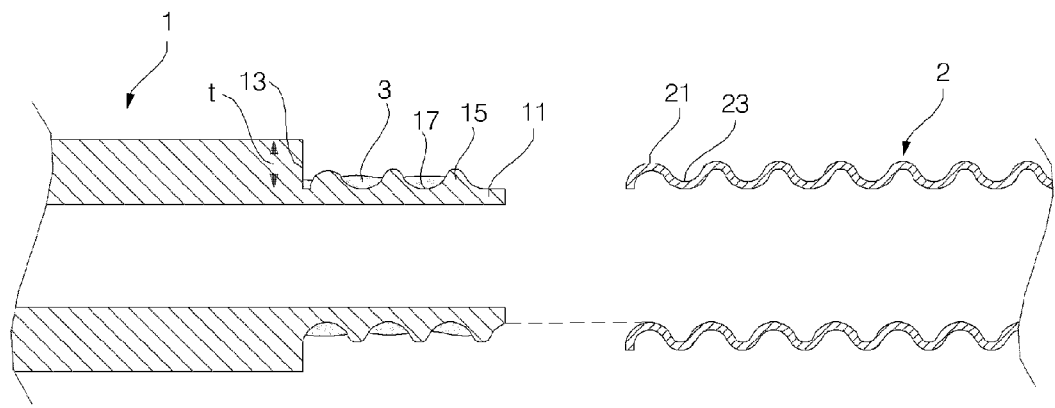

FIGS. 5 to 7 are views illustrating flexible pipe connecting structures 1 according to other embodiments of the present invention.

Referring to FIG. 5, a flexible pipe connecting structure 1 according to another embodiment of the present invention includes an outer surface formed with a ledge 13. An outer surface of a connecting part 11 is brought in contact with an inner surface of an end portion 25 of a flexible pipe 2.

The end portion 25 of the flexible pipe 2 may be inserted into the connecting part 11 of the flexible pipe connecting structure 1. In this case, a filler metal 3 may be applied on an inner surface of the end portion 25 of the flexible pipe 2 or an outer surface of the connecting part 11. Preferably, as shown in FIG. 5, the filler metal 3 is applied on an outer surface of the connecting part 11.

The end portion 25 of the flexible pipe 2 is inserted into the connecting part 11 with the filler metal 3 applied. The ledge 13 is formed as a step part 13 on an outer surface of the flexible pipe connecting structure 1. The end portion 25 of the flexible pipe 2 is inserted along an outer surface of the connecting part 11 and brought in contact therewith, and the filler metal 3 is melted and welded between the outer surface of the connecting part 11 and at least some of ridges or valleys of the end portion 25 of the flexible pipe 2. The step part 13 is welded to an end section D of the end portion 25 of the flexible pipe 2 to prevent the filler metal 3 from flowing down along the outer surface of the flexible pipe connecting structure 1 when melted.

Referring to FIGS. 6 and 7, the flexible pipe 2 connected with the flexible pipe connecting structure 1 according to another embodiment of the present invention includes spiral ridges 21 and valleys 23. The connecting part 11 includes spiral ridges 15 and valleys 17 that correspond to the ridges 21 and the valleys 23 of the flexible pipe 2. Thus, the flexible pipe 2 is rotatingly connected with the connecting part 11.

The flexible pipe 2 includes the spiral ridges 21 and the valleys 23, and the connecting part 11 includes the spiral ridges 15 and the valleys 17 that correspond to the ridges 21 and the valleys 23 of the flexible pipe 2.

The spiral is preferably formed to be such a spiral as a screw. The flexible pipe 2 and the connecting part 11 are rotatingly connected to each other in a screwing manner by the ridges 15 and the valleys 17. By doing so, the flexible pipe 2 is connected with the connecting part 11 by a predetermined strength before welding.

The filler metal 3 applied on the connecting part 11 is provided between the connecting part 11 and the ridges 21 and/or valleys 23 of the flexible pipe 2 when the flexible pipe 2 is rotatingly connected to the connecting part 11. Under this circumstance, the filler metal 3 is melted and the flexible pipe 2 is welded to the connecting part 11.

An embodiment where the end portion 25 of the flexible pipe 2 is connected to the connecting part 11 will now be described. As shown in FIG. 6, an outer surface of the end portion 25 of the flexible pipe 2 is rotatingly connected to an inner surface of the connecting part 11. The step part 13 is formed on an inner surface of the connecting part 11.

The end portion 25 of the flexible pipe 2 is inserted into an inside of the connecting part 11, and the outer surface of the end portion 25 of the flexible pipe 2 is brought in contact with the inner surface of the connecting part 11. At this time, the flexible pipe 2 is rotatingly connected to the connecting part 11 by the ridges 15 and the valleys 17 of the connecting part 11. The filler metal 3 applied on the connecting part 11, upon connection of the flexible pipe 2, is provided in a good amount between the valleys 23 of the flexible pipe 2 and the connecting part 11 while a tiny amount of the filler metal 3 may be provided between the connecting part 11 and the ridges 21 of the flexible pipe 2 due to, for example, a dimensional tolerance of the flexible pipe 2. The filler metal 3 is melted as described above, so that the connecting part 11 is welded to the flexible pipe 2.

Another embodiment where the end portion 25 of the flexible pipe 2 is connected to the connecting part 11 will now be described. As described in FIG. 7, the connecting part 11 is inserted into an inside of the end portion 25 of the flexible pipe 2 so that the inner surface of the end portion 25 of the flexible pipe 2 is brought in contact with the outer surface of the connecting part 11. At this time, the flexible pipe 2 is rotatingly connected to the connecting part 11 by the ridges 15 and the valleys 17 of the connecting part 11. Upon connection of the flexible pipe 2, the filler metal 3 applied on the connecting part 11 is provided in a good amount between the connecting part 11 and the valleys 23 of the flexible pipe 2 while a tiny amount of the filler metal 3 may be provided between the connecting part 11 and the valleys 23 of the flexible pipe 2 due to, for example, a dimensional tolerance of the flexible pipe 2. As described above, the filler metal 3 may be melted so that the connecting part 11 is welded to the flexible pipe 2.

Figure 8:
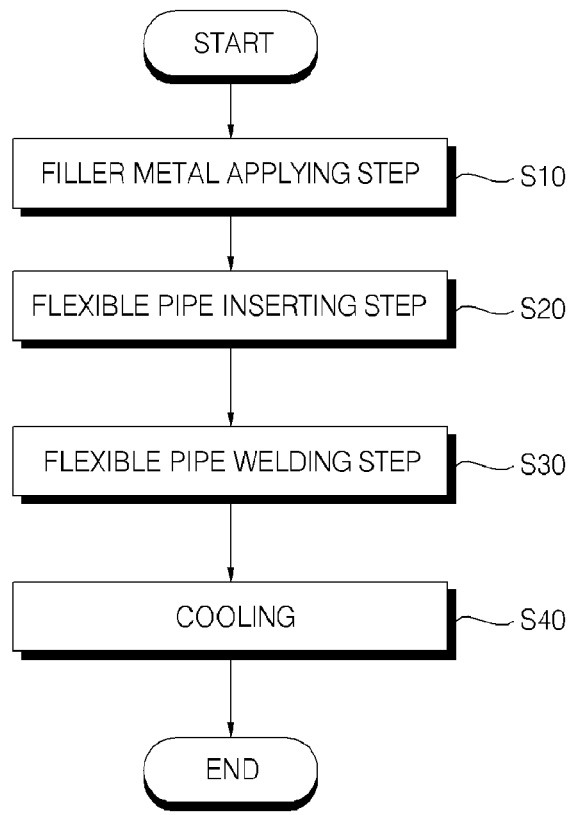
FIG. 8 is a flowchart illustrating a method of welding the flexible pipe connecting structure 1 to the flexible pipe 2 according to an embodiment of the present invention.

FIG. 8 is a flowchart illustrating a method of welding the flexible pipe connecting structure 1 to the flexible pipe 2 according to an embodiment of the present invention.

Referring to FIG. 8, a method of welding the flexible pipe connecting structure 1 to the flexible pipe 2 according to an embodiment of the present invention includes a step S10 of applying the filler metal 3 on at least one of the end portion 25 of the flexible pipe 2 having the ridges 21 and valleys 23 and the connecting part 11 of the flexible pipe connecting structure 1 into which the end portion 25 of the flexible pipe 2 is inserted; a step S20 of inserting the end portion 25 of the flexible pipe 2 into the connecting part 11 of the flexible pipe connecting structure 1 so that the end portion 25 is held by the ledge 13 formed on the flexible pipe connecting structure 1; and a step S30 of heating at least a part of the flexible pipe 2 inserted into the flexible pipe connecting structure 1 so that the end portion 25 of the flexible pipe 2 is welded to the flexible pipe connecting structure 1 by the filler metal 3.

In step S10, the filler metal 3 is applied on at least one of the connecting part 11 of the flexible pipe connecting structure 1 and the end portion 25 of the flexible pipe 2. As described above in connection with FIGS. 1 to 7, the position on which the filler metal 3 is applied varies with the embodiments where the end portion 25 of the flexible pipe 2 is inserted into the flexible pipe connecting structure 1. The position of application of the filler metal 3 is determined depending on the embodiments where the end portion 25 of the flexible pipe 2 is inserted into the connecting part 11.

In step S20, the end portion 25 of the flexible pipe 2 is inserted into the connecting part 11 according to the embodiments described with reference to FIGS. 1 to 5. Specifically, one of the outer surface and the inner surface of the connecting part 11 is correspondingly brought in contact with one of the inner surface and the outer surface of the end portion 25 of the flexible pipe 2. When the end portion 25 of the flexible pipe 2 is inserted into an inside of the connecting part 11, the outer surface of the end portion 25 of the flexible pipe 2 is brought in contact with the inner surface of the connecting part 11. At this time, in step S10, the filler metal 3 is applied on the inner surface of the connecting part 11 in advance. Also, when the end portion 25 of the flexible pipe 2 is inserted along the outer surface of the connecting part 11, the inner surface of the end portion 25 of the flexible pipe 2 is brought in contact with the outer surface of the connecting part 11. At this time, in step S10, the filler metal 3 is previously applied on the outer surface of the connecting part 11. Although it is hereinafter described that the outer surface of the end portion 25 of the flexible pipe 2 contacts the inner surface of the connecting part 11, the present invention is not limited thereto.

Also, in step S20, as shown in FIG. 6 or 7, the flexible pipe 2 having the spiral ridges 21 and valleys 23 may be rotatingly connected/inserted into the connecting part 11 having the spiral ridges 21 and valleys 23 that correspond to the ridges 21 and valleys 23 of the flexible pipe 2.

In step S20, with the filler metal 3 applied, the end portion 25 of the flexible pipe 2 is inserted into the flexible pipe connecting structure 1 and the end portion 25 of the flexible pipe 2 is held by the ledge 13.

In step S30, the flexible pipe connecting structure 1 and the flexible pipe 2 reach a welding temperature by a welding device or a heat treatment furnace and, at the welding temperature, the filler metal 3 is melted so that the end portion 25 of the flexible pipe 2 is welded to the flexible pipe connecting structure 1.

In step S30, at least the ledge 13 is welded to the end section D of the flexible pipe 2 by the filler metal 3. That is, the ledge 13 is welded to the end section D of the flexible pipe 2 so that the melted filler metal 3 is prevented from flowing down between the end portion 25 of the flexible pipe 2 and the connecting part 11. Also, the filler metal 3 may be welded to part of the end section D of the flexible pipe 2 or may be welded to between the ledge 13 and the entire circumference of the end section D. As described above, for the ledge 13 to prevent the melted filler metal 13 from flowing down, the filler metal 3 is melted and welded between the end section D of the flexible pipe 2 and the ledge 13. Also, since welding is done between the end section D of the flexible pipe 2 and the ledge 13, the end portion 25 of the flexible pipe 2 may be welded to the connecting part 11 of the flexible pipe connecting structure 1 without the filler metal 3 applied on the ridges 21 and valleys 23 of the end portion 25 flowing to the outside.

In step S30, the connecting part 11 is welded by the filler metal 3 to at least some of the ridges 21 and the valleys 23 of the end portion 25 of the flexible pipe 2 inserted into the connecting part 11.

Specifically, as shown in FIG. 2, the filler metal 3 is filled in at least some of the valleys 23 of the end portion 25 of the flexible pipe 2 inserted into the connecting part 11 of the flexible pipe connecting structure 1 so that the connecting part 11 may be welded to the flexible pipe 2. That is, when the end portion 25 of the flexible pipe 2 is inserted into the connecting part 11 with the filler metal 3 applied on the connecting part 11, the filler metal 3 is filled in at least some of the valleys 23 that are empty spaces between the connecting part 11 and the end portion 25 of the flexible pipe 2, and under this circumstance, melting is performed so that the connecting part 11 is welded to the end portion 25 of the flexible pipe 2.

Also, as shown in FIG. 4, the filler metal 3 may be melted and welded to between the connecting part 11 and at least some of the ridges 21 of the end portion 25 of the flexible pipe 2. Further, the filler metal 3 may be filled in some of the ridges 21 and some of the valleys 23 so that the connecting part 11 may be welded to the end portion 25 of the flexible pipe 2.

In addition, as shown in FIGS. 6 and 7, even in a case where the connecting part 11 of the flexible pipe connecting structure 1 is rotatingly connected to the end portion 25 of the flexible pipe 2, the filler metal 3 may be filled in at least some of the ridges 21 and/or valleys 23 so that the connecting part 11 may be welded to the end portion 25 of the flexible pipe 2.

Upon welding between the flexible pipe 2 and the flexible pipe connecting structure 1, a temperature at which the flexible pipe 2 is subjected to welding ranges from 1050° C. to 1150° C. This temperature corresponds to a solution heat treatment temperature to remove a welding stress and working hardening. The filler metal 3 includes a material that begins to be melt at 1050° C. to 1150 for welding. As described above, a BNi-based filler metal is used as the filler metal 3. Accordingly, upon heat treatment of the flexible pipe 2, the heat treatment of the flexible pipe 2 and welding by the filler metal 3 (brazing welding, brazing) are simultaneously performed in the same heat treatment furnace. As such, no separate welding process is required, thus saving manufacturing costs. Also, a thermal stress due to welding heat, which may be generated when a separate welding process is carried out, does not occur, thus preventing corrosion due to a thermal stress of the welded zone.

Further, when the filler metal 3 is melted and welded, heat is evenly spread over the flexible pipe 2 and the flexible pipe connecting structure 1, which helps the filler metal 3 to be easily melted and welded, thus enhancing a welding strength.

Also, since the flexible pipe 2 and the flexible pipe connecting structure 1 are integrally welded to each other in the heat treatment furnace, welding may be performed irrespective of the length of the flexible pipe 2. And, since the flexible pipe connecting structure 1 is provided and thus no separate welding ring is required, welding may be done even by an unskilled person.

Finally, the flexible pipe connecting structure 1 and the flexible pipe 2 having completely experienced the heat treatment and welding are withdrawn from the inside by a heat treatment, so that welding is complete.

The invention has been explained above with reference to exemplary embodiments.

It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

The invention claimed is:

1. A flexible pipe connected with a flexible pipe connecting structure, wherein
   the flexible pipe connecting structure includes a ledge on an outer surface or an inner surface, and wherein the flexible pipe includes a first end portion having ridges and valleys, wherein the flexible pipe is inserted into at least a part of the connecting structure so that the first end portion is held by the ledge, wherein the first end portion is welded to the connecting structure by a filler metal,
   wherein the connecting structure includes:
      a body part configured to extend the flexible pipe or connect with another pipe or device; and
      a connecting part configured to have a smaller thickness than a thickness of the body part, wherein the first end portion is inserted into and welded to the connecting part, wherein the ledge is a step part provided between the body part and the connecting part, wherein the flexible pipe includes spiral ridges and valleys, wherein the connecting part includes spiral ridges and valleys that correspond to the ridges and valleys of the flexible pipe so that the flexible pipe is rotatingly connected to the connecting part, and
   wherein at least some of the ridges and valleys of the first end portion of the flexible pipe is welded to the valleys and the ridges of the connecting part by the filler metal.

2. A method of connecting a flexible pipe connecting structure with a flexible pipe, comprising:
   a filler metal applying step of applying a filler metal on at least one of a first end portion of the flexible pipe having ridges and valleys or a connecting part of the flexible pipe connecting structure into which the first end portion is inserted, such that the filler metal is filled between an outer surface of the first end portion of the flexible pipe and an inner surface of the connecting part of the flexible pipe connecting structure,
   wherein the connecting structure includes:
      a body part configured to extend the flexible pipe or connect with another pipe or device, and
      a connecting part configured to have a smaller thickness than a thickness of the body part, wherein the first end portion is inserted into and welded to the connecting part, wherein a ledge is a step part provided between the body part and the connecting part;
   a flexible pipe inserting step of inserting the first end portion of the flexible pipe into the connecting part of the flexible pipe connecting structure so that the first end portion is held by the ledge formed on the flexible pipe connecting structure, wherein the flexible pipe having spiral ridges and valleys are rotatingly inserted into the connecting part having spiral ridges and valleys that correspond to the ridges and valleys of the flexible pipe; and
   a flexible pipe welding step of heating at least a part of the flexible pipe inserted into the flexible pipe connecting structure so that the first end portion of the flexible pipe is welded to the flexible pipe connecting structure by the filler metal, wherein the flexible pipe welding step is performed in a furnace at a temperature of 1050° C. to 1150° C. so that a welding process and a heat treatment process are simultaneously performed,
   wherein the flexible pipe is formed of a austenite-based stainless steel, the connecting structure is formed of a carbon steel, and the filler metal is formed of a BNi-based material.

3. The method of connecting a flexible pipe connecting structure with a flexible pipe of claim 2, wherein in the flexible pipe welding step, at least the ledge and an end section of the flexible pipe are welded to each other by the filler metal.

4. The method of connecting a flexible pipe connecting structure with a flexible pipe of claim 2, wherein in the flexible pipe welding step, the connecting part is welded to at least some of ridges and valleys of the first end portion of the flexible pipe inserted into the connecting part by the filler metal.

5. The method of connecting a flexible pipe connecting structure with a flexible pipe of claim 2, wherein the flexible pipe welding step is performed with the filler metal filled in at least some of valleys of the first end portion of the flexible pipe inserted into the connecting part.

6. A method of connecting a flexible pipe connecting structure with a flexible pipe, comprising:
   a filler metal applying step of applying a filler metal on at least one of a first end portion of the flexible pipe having ridges and valleys or a connecting part of the flexible pipe connecting structure into which the first end portion is inserted, such that the filler metal is filled between an outer surface of the first end portion of the flexible pipe and an inner surface of the connecting part of the flexible pipe connecting structure,
   wherein the connecting structure includes:
   a body part configured to extend the flexible pipe or connect with another pipe or device, and
   a connecting part configured to have a smaller thickness than a thickness of the body part, wherein the first end portion is inserted into and welded to the connecting part, wherein a ledge is a step part provided between the body part and the connecting part;
   a flexible pipe inserting step of inserting the first end portion of the flexible pipe into the connecting part of the flexible pipe connecting structure so that the first end portion is held by the ledge formed on the flexible pipe connecting structure; and
   a flexible pipe welding step of heating at least a part of the flexible pipe inserted into the flexible pipe connecting structure so that the first end portion of the flexible pipe is welded to the flexible pipe connecting structure by the filler metal, wherein in the flexible pipe inserting step, the flexible pipe having spiral ridges and valleys are rotatingly inserted into the connecting part having spiral ridges and valleys that correspond to the ridges and valleys of the flexible pipe.

\* \* \* \* \*